Nov. 18, 1969  R. L. HURD  3,478,564
CRIMPING TOOL
Filed Dec. 14, 1967  2 Sheets-Sheet 2
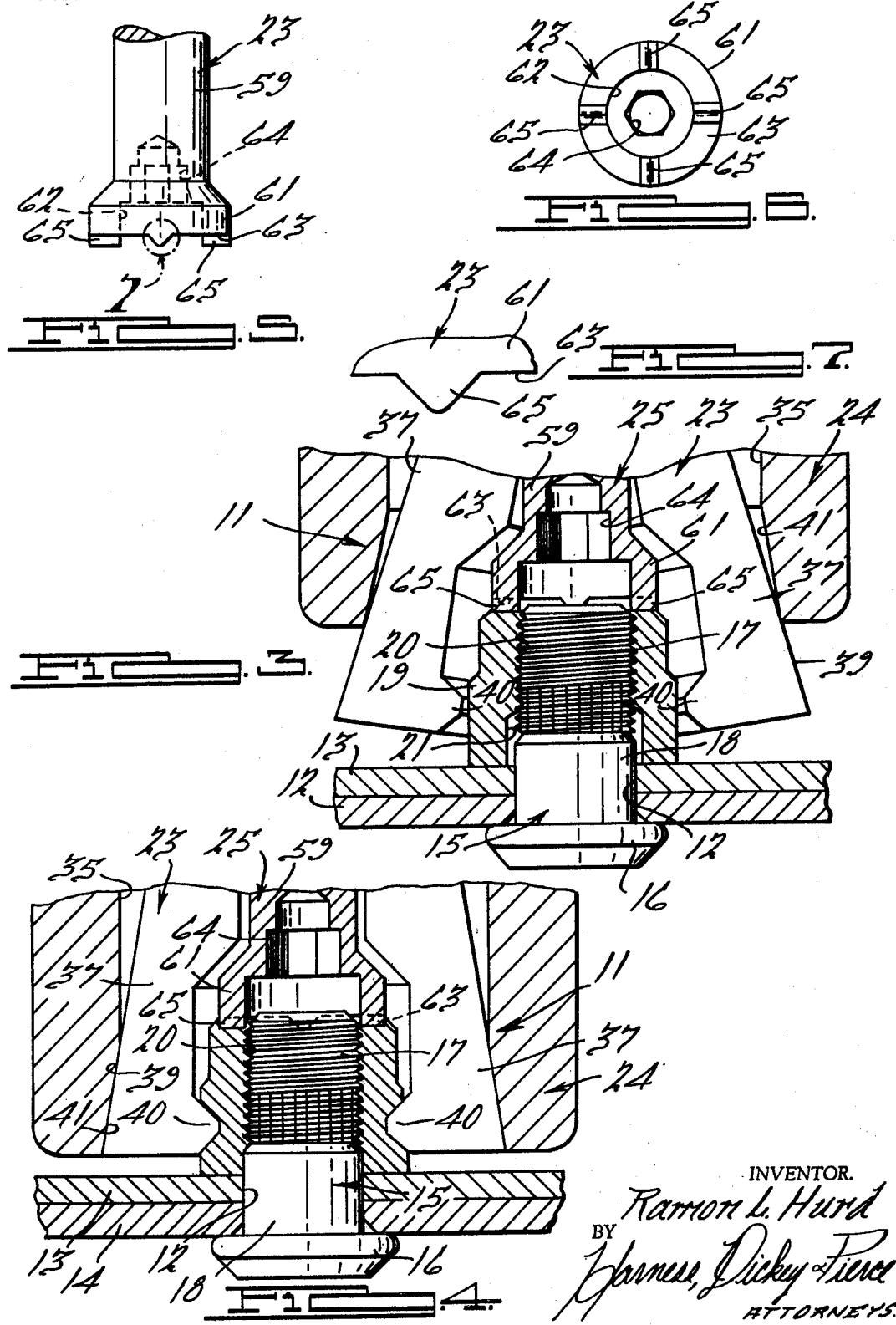

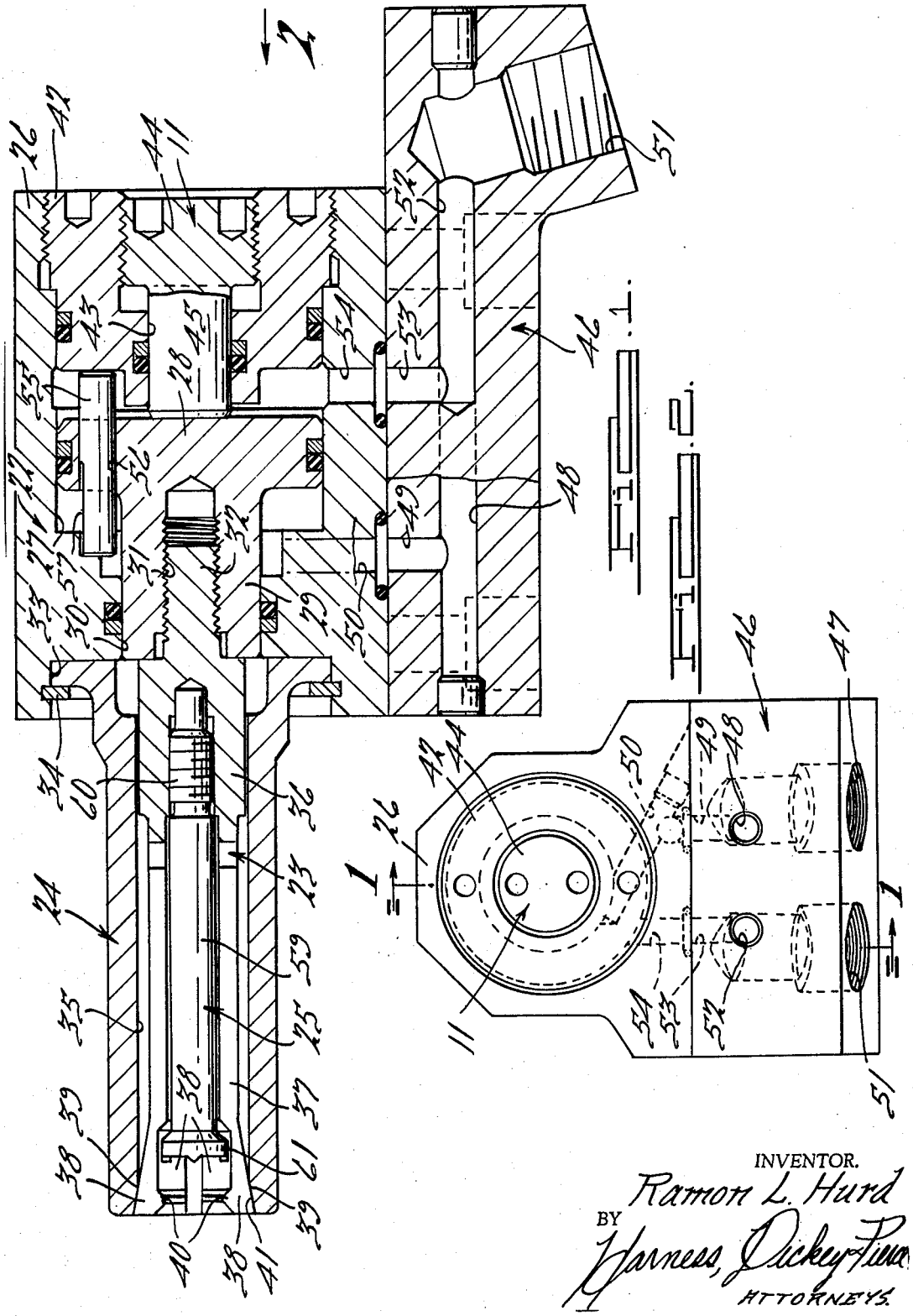

United States Patent Office 3,478,564
Patented Nov. 18, 1969

3,478,564
CRIMPING TOOL
Ramon L. Hurd, Royal Oak, Mich., assignor to Huck Manufacturing Company, Detroit, Mich., a corporation of Michigan
Filed Dec. 14, 1967, Ser. No. 690,557
Int. Cl. B21d 9/05, 31/00
U.S. Cl. 72—391                      2 Claims

ABSTRACT OF THE DISCLOSURE

An installation tool for applying a fastener which comprises a bolt and a collar or nut in which a radially directed crimping force is applied to the nut substantially therearound, after the nut is first threaded on the bolt, to effect an elongation of the nut and in which locating means are incorporated in the tool to assure proper location of the crimp and to accommodate the force caused by elongation of the nut.

---

The present invention relates to improvements in crimping tools particularly of the type which are used for the installation of fasteners.

The installation tool of the present invention has particular utility for use with a special type of fastener. As here illustrated, such a fastener comprises a bolt and special form of nut or collar in which the nut is first threaded onto the bolt and thereafter crimped. The affect of the crimping is to cause a portion of the counterbore of the collar to be forced into additional locking grooves on the pin and to effect an elongation of the collar or nut which places the bolt under high residual tension. In order to be assured of the predetermined and uniform clamping forces and the high tensile values of these fasteners, the crimping action of the installation must be properly and uniformly located with respect to the nut during the crimping operation and the elongation of the collar during crimping must be accommodated. Accordingly, it is one of the primary objects of the present invention that a positive locating means be provided in the tool which does not interfere with the crimping action, but at the same time assures a proper location of the crimping portion of the tool with respect to the collar and also accommodates the reaction force against it caused by such elongation.

Other objects of the invention will become apparent from the following specification, the drawings relating thereto and from the claims hereinafter set forth.

In the drawings in which like numerals are used to designate like parts in the several views throughout;

FIGURE 1 is a cross-sectional view showing an installation tool of the present invention incorporating the locater of the present invention which accommodates the elongation of the collar during crimping and with the crimping jaws shown in closed position;

FIGURE 2 is an end elevational view of the FIGURE 1 taken in the direction of the arrow "2";

FIGURE 3 is an enlarged partial view of FIGURE 1 showing the tool in its relationship to the fastener being applied at the initial stages of crimping;

FIGURE 4 is a view similar to FIGURE 3 at the completion of the crimping operation;

FIGURE 5 is a partial elevational view of the end of the locater bar;

FIGURE 6 is an end elevational view of FIGURE 5; and

FIGURE 7 is an enlarged view of the structure within the circle 7 of FIGURE 5.

Referring to the drawings, an installation tool incorporating features of the present invention is generally indicated at 11 and is illustrated in FIGURES 3 and 4 in its position with respect to the work. Panels 12 and 13 having aligned openings 14 therethrough are adapted to be secured together by means of the fastener which includes a bolt 15 having an integral head 16, a threaded end portion 17 and an intermediate smooth portion 18. The bolt 15 is adapted to extend through the aligned openings 14 with a threaded end 17 projecting therebeyond onto which a nut 19 is torqued.

Such nut 19 has a threaded end 20 with the exterior thereof properly formed for the application of a wrench. The nut 19 also has a smooth counterbore 21. The nut 19 is first torqued onto the bolt 15, with proper grip application so that when the nut 19 is against the adjacent face of panel 13, a portion of the counterbore 21 overlies the intermost threads 17 which provide locking grooves.

Since the nut 19 is first torqued onto the bolt 15, they are thus fixed together. During the crimping operation the crimp is applied to the smooth counterbore portion of the nut overlying the innermost locking grooves and is forced into such grooves providing additional thread bearing and causing an elongation of the collar which causes the pin to correspondingly elongate and places it under additional tension i.e., additional to any tension that has been applied to the bolt caused by the initial torquing of the nut.

By properly locating the crimping portion of the tool with respect to its proper longitudinal position with respect to the nut, the crimping parts of the tool will therefore overly the proper part of the counterbore and assure a predetermined and uniform clamping force and high tensile values mentioned above.

The crimping tool 11 comprises a cylinder assembly generally indicated at 22, a crimping collet generally indicated at 23, a collet actuting member or housing generally indicated at 24 and a locating means generally indicating at 25.

The cylinder assembly 22 comprises a cylinder 26 having a cylindrical bore 27 therethrough.

A piston 28 is mounted for reciprocation within the bore 27. Such piston has a cylindrical rod 29 which projects through a sealed opening 30 formed in one end of the housing 26. The rod 29 is provided with a threaded opening 31 therein which is adapted to threadably receive a reduced threaded projection 32 of the collet 23. The collet 23 may thus be adjustably positioned with respect to the piston 28. The housing 26 is formed with a counterbore 33 which receives the annular flange end of the barrel housing 24. The barrel housing 24 is fixed in such counterbore 33 by means of an arc ring 34 which is snapped into an annular groove provided in the counterbore 33 and abuts the adjacent flange of the housing 24.

The housing 24 has a cylindrical opening 35 therethrough which is concentric to the collet 23.

The collet 23 has a cylindrical body portion 36 which is concentric with the threaded end 32. Such body portion 36 has forwardly extending longitudinally extending resilient crimping fingers 37, there being four of such fingers in the embodiment illustrated and which may be resiliently moved from the open position shown in FIGURE 3 to the closed position shown in FIGURE 4. Such fingers 37 terminate at the outer ends in crimping jaws 38 which have outer tapered surfaces 39 and which have inwardly directed crimping projections 40.

The barrel 24 has tapered surfaces 41 which lie adjacent and embrace the tapered surfaces 39 of the crimping jaws 38 so that upon relative longitudinal movement between the housing 24 and the collet 25, the crimping jaws are caused to move from open to closed positions.

The housing 24 is fixed to the housing 22 and the collet 25 is fixed to the piston 28 so that upon reciprocation of the piston this relative movement between the collet 25 and the housing 24 is effected.

The means for causing reciprocation of piston 28 may be either of the air or hydraulic types, both known, and one of such means is shown here for purpose of illustration and completion.

The housing 26 is closed at the opposite end by means of a cylinder end cap 42, which is threaded into the end of the housing 26. Such end cap has a central sealed opening 43 therethrough which receives an adjustable stop 44. Such stop 44 has a threaded end which is threaded into a threaded opening in the outer face of cap 42 with a smooth cylindrical portion 45 received within the opening 43 and projecting therebeyond into contact with the adjacent end face of the piston 28. By adjusting the stop 44 the stroke of the piston 28 may be adjusted.

An adapter for the introduction and exhaust of the actuating fluid is generally indicated at 46 and is suitably secured to the underside of housing 26. Such housing 46 has an inlet port 47 communicating with a longitudinally extending inlet passage 48 formed therein which in turn communicates with passage 49 with inlet passage 50 formed in the housing 26 on the rod side of the piston 28. The inlet passage 50 communicates with the piston bore 27 so that upon application of fluid under pressure, the piston is caused to move toward the right (viewing FIGURE 1).

An exhaust port 51 is provided in the adapter housing 46 which communicates with an exhaust passage 52. Such exhaust passage 52 communicates through passage 53 with an exhaust passage 54 formed in the housing 26. Such exhaust passage 54 communicates with the bore 47 of the housing 26 on the right side of the piston 28 (viewing FIGURE 1).

A dump or relief valve 55 of known structure and function is mounted within the housing 26 and projects through an opening 56 formed in the piston 28. The valve is generally in the form of a cylindrical pin having a flat or reduced portion 57 formed thereon which is disposed on the rod side of the piston 28 and is of such length that upon reciprocation of the piston, fluid may bleed therethrough on opposite sides of the piston.

It will thus be evident that upon controlled introduction of fluid pressure through passages 47, 48, 49 and 50 (from a known source), the piston 28 is caused to move to the position shown in FIGURE 1 and the crimping jaws are in the closed or crimped position shown in FIGURE 1. At this time the fluid exhausts through passages 54, 53, 52 and 51.

The fluid flow may then be reversed so that the fluid under pressure is introduced through the passages indicated to cause a relative movement between the collet 23 and the housing 24 so that the crimping jaws move forwardly out of the housing 24 to open position.

The stop 25 of the present invention consists of an elongated rod 59 terminating in a threaded end 60. At the opposite end, the rod 59 terminates in a locater face 61 which is formed with a counterbore 62 and which has an annular end face 63. The threaded end 60 of the rod 59 is threaded into a threaded opening formed in the body 36 of the collet 23 and may be adjusted therealong by means of a suitable tool which may be inserted into a cooperating socket 64 formed in the end of the counterbore 62. The stop member 25 is thus concentrically disposed with respect to the collet 23 and the housing 24 and is of such a rigid character that in its adjusted position is rigidly located longitudinally with respect to the collet 23.

According to the present invention, the face 63 of the locater 23 is formed with a plurality of annularly and equally spaced projections 65 thereon which are disposed radially on the face 63. In the embodiment illustrated, the projections 65 are shown in the form of narrow transverse ridges 65 and are generally pointed toward the open end of the housing 24 so that when the locater is in the initial position, as shown in FIGURE 3, such projections 65 engage the adjacent face of the nut 19. The material of the locater 23, particularly that of the projections 65, is harder than the material of the nut 19. Thus, during the crimping of the nut 19 between the position shown in FIGURES 3 and 4, as the nut 19 elongates due to such crimping, the reaction force against the projection 65 is accommodated by the brinelling or indenting of such projections into the abutting end face of the nut as shown in FIGURE 4. While the force caused by such elongation is relatively high, the linear extent of the elongation is relatively low so that it is accommodated by a brinelling or indenting of the projections thereinto.

Formal changes and variations may be made in the various embodiments of the invention described without departing from the spirit and scope of the invention as set forth in the appended claims.

What is claimed is:

1. A fastener installation tool for installing a fastener which comprises a pin having a head and shank and locking grooves formed in the shank at a position spaced from said head and a nut disposed on said shank at a position in the bracing relationship with respect to said grooves, said tool comprising a tubular barrel member provided with an open end, a plurality of longitudinally extending radially movable crimping jaws concentrically disposed within said barrel member, said jaws and said barrel being longitudinally movable with respect to each other between open and closed positions of said jaws, the outer ends of said jaws and barrel member having cooperating tapered surfaces to effect radial movement of said jaws upon relative longitudinal movement between said jaws and said barrel member, means to effect such relative longitudinal movement, a fastener engaging stop mounted within said tool in predetermined longitudinal position with respect to said jaws provided with an end face, said end face having projection means formed therearound to engage the outer end of said nut and locate said jaws with respect thereto and to indent into said nut and thus accommodate the reaction force against it caused by elongation of the nut during crimping.

2. A fastener installation tool according to claim 1 in which the fastener engaging stop is rigidly mounted within the tool and in which the projection means on the end face include a plurality of projections uniformly spaced therearound.

References Cited

UNITED STATES PATENTS

| 2,384,690 | 9/1945 | Mullgardt | 72—391 |
| 3,122,948 | 3/1964 | Baugh | 72—391 |
| 3,362,211 | 1/1968 | Chirco | 72—391 |

CHARLES W. LANHAM, Primary Examiner

G. P. CROSBY, Assistant Examiner

U.S. Cl. X.R.

29—517